United States Patent
Kano et al.

(10) Patent No.: US 11,447,100 B2
(45) Date of Patent: Sep. 20, 2022

(54) INFORMATION PROCESSING APPARATUS, AUTHENTICATION SYSTEM, INFORMATION PROCESSING METHOD, AND PROGRAM STORAGE MEDIUM

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/330,506

(22) Filed: May 26, 2021

(65) Prior Publication Data
US 2021/0370875 A1 Dec. 2, 2021

(30) Foreign Application Priority Data

Jun. 1, 2020 (JP) .............................. JP2020-095692

(51) Int. Cl.
*B60R 25/24* (2013.01)
*B60R 25/04* (2013.01)
(Continued)

(52) U.S. Cl.
CPC ............ *B60R 25/245* (2013.01); *B60R 25/04* (2013.01); *B60R 25/2018* (2013.01); *G07C 9/00309* (2013.01); *G07C 9/00817* (2013.01); *B60R 2325/205* (2013.01); *G07C 2009/00539* (2013.01); *G07C 2009/00547* (2013.01); *G07C 2009/00841* (2013.01)

(58) Field of Classification Search
None
See application file for complete search history.

(56) References Cited

U.S. PATENT DOCUMENTS

| 7,474,199 B2* | 1/2009 | Nakashima | ............. B60R 25/04 340/10.5 |
| 9,563,996 B2* | 2/2017 | Ederle | ..................... B60R 25/24 |

(Continued)

FOREIGN PATENT DOCUMENTS

JP 2012-088925 A 5/2012

*Primary Examiner* — Carlos Garcia
(74) *Attorney, Agent, or Firm* — Sughrue Mion, PLLC (57) ABSTRACT

An information processing apparatus which controls locking and unlocking of a vehicle, the information processing apparatus comprises a controller configured to execute: in a case where there is an unlocking request from a first mobile terminal located outside the vehicle, receiving a first electronic key from the first mobile terminal to perform first authentication and unlocking the vehicle on condition that the first authentication is successful; and in a case where the first mobile terminal is located inside the vehicle, and there is an unlocking request from a second mobile terminal located outside the vehicle, receiving a second electronic key from the second mobile terminal to perform second authentication, receiving the first electronic key from the first mobile terminal located inside the vehicle to perform third authentication, and unlocking the vehicle on condition that both the second authentication and the third authentication are successful.

20 Claims, 9 Drawing Sheets

(51) Int. Cl.
*B60R 25/20* (2013.01)
*G07C 9/00* (2020.01)

(56) References Cited

U.S. PATENT DOCUMENTS

| | | | | |
|---|---|---|---|---|
| 2007/0229219 | A1* | 10/2007 | Nakashima | B60R 25/245 340/5.72 |
| 2014/0098959 | A1* | 4/2014 | Kawamura | H04L 9/0816 380/277 |
| 2021/0324660 | A1* | 10/2021 | Maiga | E05B 47/02 |

* cited by examiner

TRAVEL PLAN DATA

| TRAVELING START DATE AND TIME | DEPARTURE PLACE | DESTINATION | POSSIBLE TO DRIVE OR NOT | POSSIBLE TO PROVIDE VEHICLE OR NOT |
|---|---|---|---|---|
| ... | S001 | D001 | ... | ... |
| ... | S002 | D002 | ... | ... |
| ... | S003 | D003 | ... | ... |

RIDE DATA

| RIDE DATE AND TIME | TERMINAL ID | VEHICLE ID | GETTING-ON POINT | GETTING-OFF POINT |
|---|---|---|---|---|
| ... | T001 | V001 | ... | ... |
| ... | T002 | V002 | ... | ... |
| ... | T003 | V003 | ... | ... |

FIG. 9

INFORMATION PROCESSING APPARATUS, AUTHENTICATION SYSTEM, INFORMATION PROCESSING METHOD, AND PROGRAM STORAGE MEDIUM

CROSS REFERENCE TO THE RELATED APPLICATION

This application claims the benefit of Japanese Patent Application No. 2020-095692, filed on Jun. 1, 2020, which is hereby incorporated by reference herein in its entirety.

BACKGROUND

Technical Field

The present disclosure relates to a technique of locking and unlocking a vehicle using an electronic key.

Description of the Related Art

A form of travel in which a plurality of users share one vehicle (ride-sharing) has been spreading mainly in foreign countries for the purpose of relieving traffic congestion and saving fuel cost, and for the purpose of environmental measures, and the like.

Concerning this, Japanese Patent Laid-Open No. 2012-088925 discloses a system which provides support for allowing a user who is to get on a vehicle to reliably get on a reserved vehicle.

SUMMARY

Meanwhile, in a ride-sharing form in which users who first meet get on the same vehicle, it is desired to take into account security.

The present disclosure has been made in view of the above-described problem and is directed to improving safety for a driver of a ride-sharing vehicle.

The present disclosure in its one aspect provides an information processing apparatus which controls locking and unlocking of a vehicle, the information processing apparatus comprising: a controller configured to execute: in a case where there is an unlocking request from a first mobile terminal located outside the vehicle, receiving a first electronic key from the first mobile terminal to perform first authentication and unlocking the vehicle on condition that the first authentication is successful; and in a case where the first mobile terminal is located inside the vehicle, and there is an unlocking request from a second mobile terminal located outside the vehicle, receiving a second electronic key from the second mobile terminal to perform second authentication, receiving the first electronic key from the first mobile terminal located inside the vehicle to perform third authentication, and unlocking the vehicle on condition that both the second authentication and the third authentication are successful.

The present disclosure in its another aspect provides an authentication system comprising: an in-vehicle device which controls locking and unlocking of a vehicle; and a server apparatus which manages an electronic key for the locking and unlocking, wherein the server apparats comprises: a first controller configured to execute: transmitting a first electronic key to a first mobile terminal; and transmitting a second electronic key to a second mobile terminal, and the in-vehicle device comprises: a second controller configured to execute: in a case where there is an unlocking request from the first mobile terminal located outside the vehicle, receiving the first electronic key from the first mobile terminal to perform first authentication and unlocking the vehicle on condition that the first authentication is successful; and in a case where the first mobile terminal is located inside the vehicle, and there is an unlocking request from the second mobile terminal located outside the vehicle, receiving the second electronic key from the second mobile terminal to perform second authentication, receiving the first electronic key from the first mobile terminal located inside the vehicle to perform third authentication, and unlocking the vehicle on condition that both the second authentication and the third authentication are successful.

The present disclosure in its another aspect provides an information processing method for controlling locking and unlocking of a vehicle, the information processing method comprising: a step of, in a case where there is an unlocking request from a first mobile terminal located outside the vehicle, receiving a first electronic key from the first mobile terminal to perform first authentication and unlocking the vehicle on condition that the first authentication is successful; and a step of, in a case where the first mobile terminal is located inside the vehicle and there is an unlocking request from a second mobile terminal located outside the vehicle, receiving a second electronic key from the second mobile terminal to perform second authentication, receiving the first electronic key from the first mobile terminal located inside the vehicle to perform third authentication, and unlocking the vehicle on condition that both the second authentication and the third authentication are successful.

Further, another aspect includes a program for causing a computer to execute the above-described information processing method or a computer-readable storage medium in which the program is non-temporarily stored.

According to the present disclosure, it is possible to improve safety for a driver of a ride-sharing vehicle.

DESCRIPTION OF THE EMBODIMENTS

An information processing apparatus according to one aspect of the present disclosure is an apparatus which controls locking and unlocking of a vehicle on the basis of results of authenticating a first mobile terminal and a second mobile terminal.

Specifically, the information processing apparatus includes a controller configured to, in a case where there is an unlocking request from the first mobile terminal located outside the vehicle, receive a first electronic key from the first mobile terminal to perform first authentication, unlock the vehicle on condition that the first authentication has been successful, and in a case where the first mobile terminal is located inside the vehicle and there is an unlocking request from the second mobile terminal located outside the vehicle, receive a second electronic key from the second mobile terminal to perform second authentication, receive the first electronic key from the first mobile terminal located inside the vehicle to perform third authentication, and unlock the vehicle on condition that both the second authentication and the third authentication have been successful.

In a case where there is an unlocking request from the first mobile terminal, the information processing apparatus receives an electronic key from the first mobile terminal to perform authentication and unlocks the vehicle on the basis of a result of the authentication.

Meanwhile, in a case where there is an unlocking request from the second mobile terminal, the information processing apparatus performs authentication (third authentication) again for the first mobile terminal located inside the vehicle in addition to receiving an electronic key from the second mobile terminal to perform authentication. This makes it possible to confirm "whether to allow a person who is currently trying to unlock the vehicle to get on the vehicle" to a person on the vehicle. Note that in a case where the third authentication has not been successful, a user who possesses the second mobile terminal cannot get on the vehicle.

According to such a configuration, it is possible to prevent a user who meets first from unlocking a vehicle without any condition, so that it is possible to improve security.

Note that it is assumed that the first mobile terminal is located inside the vehicle from when the vehicle is unlocked with the first electronic key until when the vehicle is locked with the first electronic key.

Note that the controller may unlock the vehicle in a case where both the second authentication and the third authentication have been successful within a predetermined period.

A new user can get on the vehicle only in a case where a person on the vehicle (for example, a driver) allows the new user to get on the vehicle within the predetermined period.

Further, the first electronic key may be an electronic key issued to the driver of the ride-sharing vehicle, and the second electronic key may be an electronic key issued to a person who is to get on the ride-sharing vehicle.

It is possible to improve safety for the driver by making it necessary for the person who is to get on the vehicle to be allowed by the driver of the vehicle in order to get on the vehicle.

Further, the controller may allow unlocking and start of the vehicle in a case where the first authentication has been successful and may allow unlocking of the vehicle in a case where the second authentication has been successful.

In this manner, authority to be provided to each electronic key may be made different between the driver and the person who is to get on the vehicle.

Further, the information processing apparatus may be an apparatus mounted on the vehicle.

The apparatus can authenticate each mobile terminal by storing authentication information corresponding to the first and the second electronic keys in advance.

Further, the information processing apparatus may further include a first reading device provided outward from the vehicle, and the controller may acquire the first electronic key and the second electronic key via the first reading device to perform the first authentication and the second authentication.

The first authentication and the second authentication are performed to get on the vehicle, and thus, the electronic keys are preferably acquired with the reading device provided outward from the vehicle.

Further, the information processing apparatus may further include a second reading device provided inside the vehicle, and the controller may acquire the first electronic key via the second reading device to perform the third authentication.

The third authentication is performed for a person who has already been on the vehicle, and thus, the electronic key is preferably acquired with the reading device provided inside the vehicle.

Further, the information processing apparatus may be an apparatus provided outside the vehicle, and the controller may acquire first position information from the first mobile terminal and may acquire second position information from the second mobile terminal.

It is also possible to use an apparatus (for example, a server apparatus) provided outside the vehicle as the information processing apparatus. In this case, it is possible to determine whether an electronic key is to be used near the vehicle by making it possible to acquire position information of each mobile terminal.

Further, the controller may perform the first authentication and the third authentication in a case where a location indicated with the first position information is within a predetermined range around the vehicle and may perform the second authentication in a case where a location indicated with the second position information is within a predetermined range around the vehicle.

According to such a configuration, it is possible to allow authentication only in a case where a user is trying to get on the vehicle.

Further, the controller may transmit a notification to the first mobile terminal and the second mobile terminal in a case where the second authentication has not been performed, and a location indicated with the second position information is within a predetermined range around the vehicle.

According to such a configuration, it is possible to make a notification that a person who is to get on the vehicle is located near the vehicle, to a driver of the vehicle.

Embodiments of the present disclosure will be described below on the basis of the drawings. Configurations of the embodiments described below are examples, and the present disclosure is not limited to the configurations of the embodiments.

First Embodiment

Outline of an authentication system according to a first embodiment will be described with reference to FIG. 1. The system according to the present embodiment includes a server apparatus 100, a plurality of mobile terminals 200A, 200B, . . . , and an in-vehicle device 300 mounted on a vehicle 10.

The vehicle 10 is an automobile traveling as a ride-sharing vehicle.

The server apparatus 100 is an apparatus which accepts reservation of utilization of the ride-sharing vehicle and issues an electronic key for getting on the vehicle to a user (a driver or a passenger) who is to get on the vehicle.

The mobile terminal 200A is a computer (first mobile terminal, hereinafter, also referred to as a driver terminal) to be utilized by a user who drives the ride-sharing vehicle. Further, the mobile terminal 200B is a computer (second mobile terminal, hereinafter, also referred to as a passenger terminal) to be utilized by a user who gets on the ride-sharing vehicle as a passenger.

Hereinafter, in a case where it is not necessary to distinguish between the driver terminal and the passenger terminal, the mobile terminals 200A and 200B will be collectively referred to as a mobile terminal 200.

The in-vehicle device 300 is a computer mounted on the vehicle 10. The in-vehicle device 300 is a control device which controls locking and unlocking of a door and starting of an engine by receiving an electronic key from the mobile terminal 200 through near field communication and authenticating the electronic key.

Figure 2A:
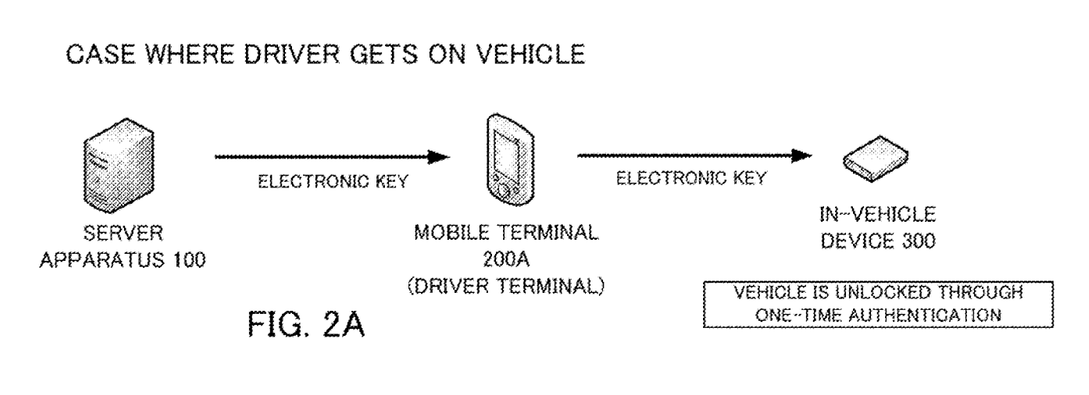
FIG. 2A and FIG. 2B are diagrams for explaining outline of the authentication system.

FIG. 2A is a diagram for explaining flow of data when a driver of the vehicle 10 gets on the vehicle. The mobile terminal 200A which is a driver terminal reserves utilization of a ride-sharing vehicle to the server apparatus 100, and the server apparatus 100 issues an electronic key (first electronic key) corresponding to the vehicle 10 to the mobile terminal 200A. The mobile terminal 200A transmits the electronic key to the in-vehicle device 300 through near field communication, and the in-vehicle device 300 authenticates this (first authentication). When the authentication has been successful, the in-vehicle device 300 unlocks the door of the vehicle 10.

Figure 2B:
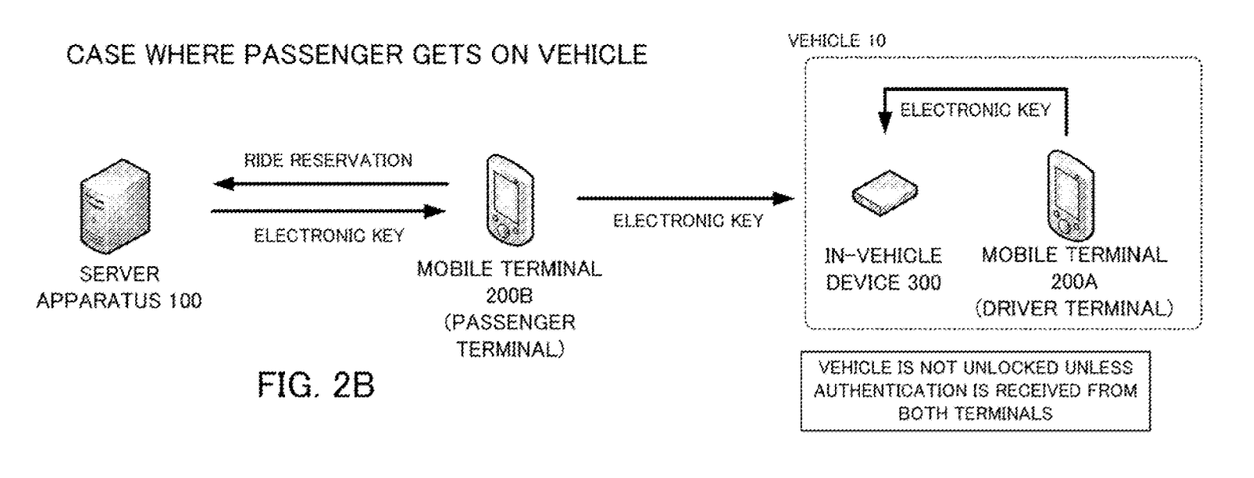

FIG. 2B is a diagram for explaining flow of data when a user who gets on the vehicle 10 as a passenger gets on the vehicle.

The mobile terminal 200B which is a passenger terminal reserves utilization of a ride-sharing vehicle to the server apparatus 100, and the server apparatus 100 issues an electronic key (second electronic key) corresponding to the vehicle 10 to the mobile terminal 200B. When the passenger gets on the vehicle 10, the mobile terminal 200B transmits the electronic key to the in-vehicle device 300 through near field communication, and the in-vehicle device 300 authenticates this (second authentication).

Meanwhile, when the second electronic key is transmitted from the passenger terminal, the in-vehicle device 300 requests authentication (third authentication) again to the driver terminal. Here, the first electronic key is transmitted from the driver terminal, and when authentication is successful for both the electronic keys, the in-vehicle device 300 unlocks the door of the vehicle 10.

In other words, when the passenger tries to unlock the vehicle 10 in a state where the driver has already been on the vehicle 10, the in-vehicle device 300 proceeds with unlocking process on condition that agreement is obtained from the driver. This makes it possible for the driver to determine whether or not to allow the passenger to get on the vehicle after actually confirming appearance of the passenger.

Components of the system will be described in detail.

The server apparatus 100 can be formed from a general-purpose computer. In other words, the server apparatus 100 can be formed as a computer including a processor such as a CPU and a GPU, a main memory such as a RAM and a ROM and an auxiliary memory such as an EPROM, a hard disk drive and a removable medium. Note that the removable medium may be, for example, a USB memory or a disk recording medium such as a CD and a DVD. An operating system (OS), various kinds of programs, various kinds of tables, and the like, are stored in the auxiliary memory, and respective functions which suit predetermined purposes as will be described later can be implemented by the programs stored therein being executed. However, part or all of the functions may be implemented with a hardware circuit such as an ASIC and an FPGA.

Figure 1:
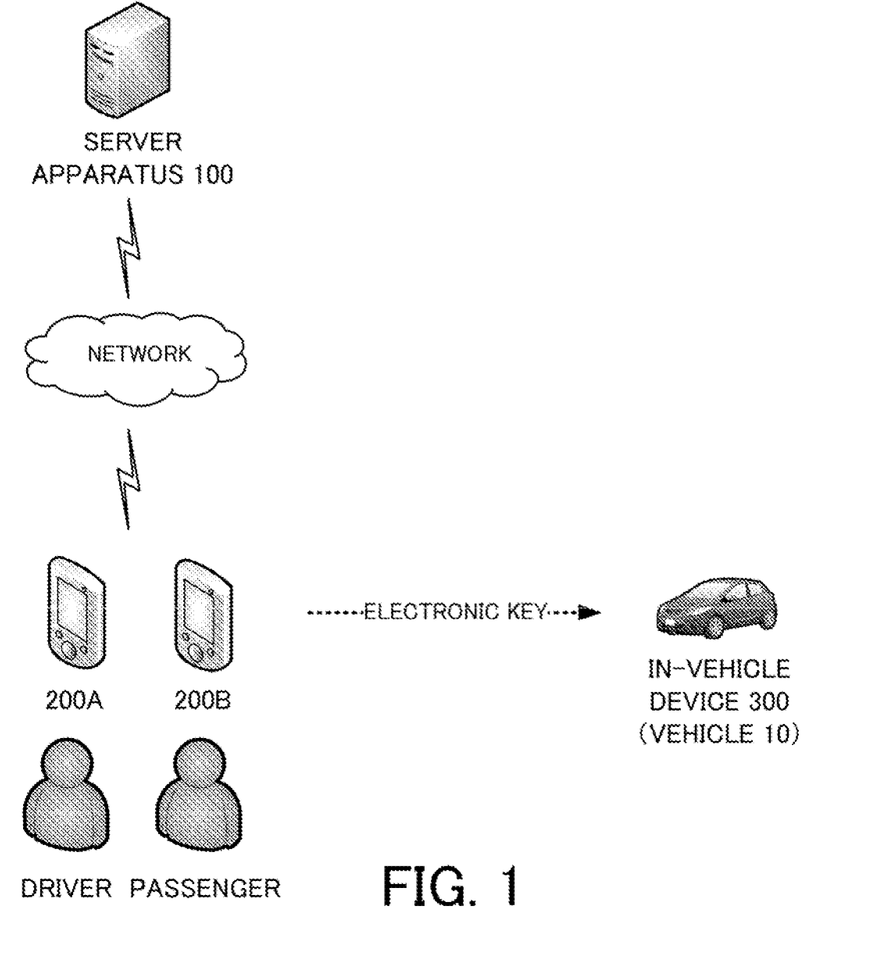
FIG. 1 is a schematic configuration diagram of an authentication system according to a first embodiment.
Figure 3:
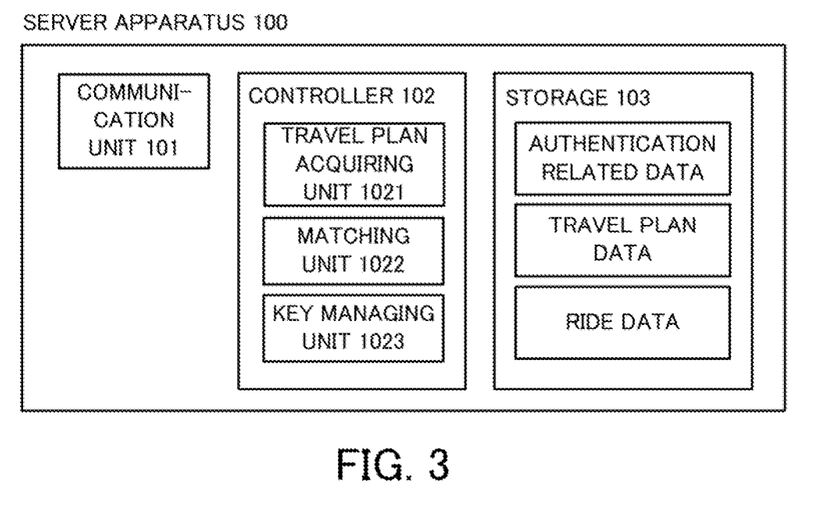
FIG. 3 is a block diagram schematically illustrating an example of a server apparatus.

FIG. 3 is a block diagram schematically illustrating an example of a configuration of the server apparatus 100 illustrated in FIG. 1. The server apparatus 100 includes a communication unit 101, a controller 102, and a storage 103.

The communication unit 101 is an interface for performing communication with the mobile terminal 200 and the in-vehicle device 300 via a network.

The controller 102 is a unit configured to control the server apparatus 100. The controller 102 is, for example, formed from a CPU.

The controller 102 includes a travel plan acquiring unit 1021, a matching unit 1022 and a key managing unit 1023. Each functional module may be implemented by a program stored in storage such as a ROM being executed by a CPU.

Figure 4:
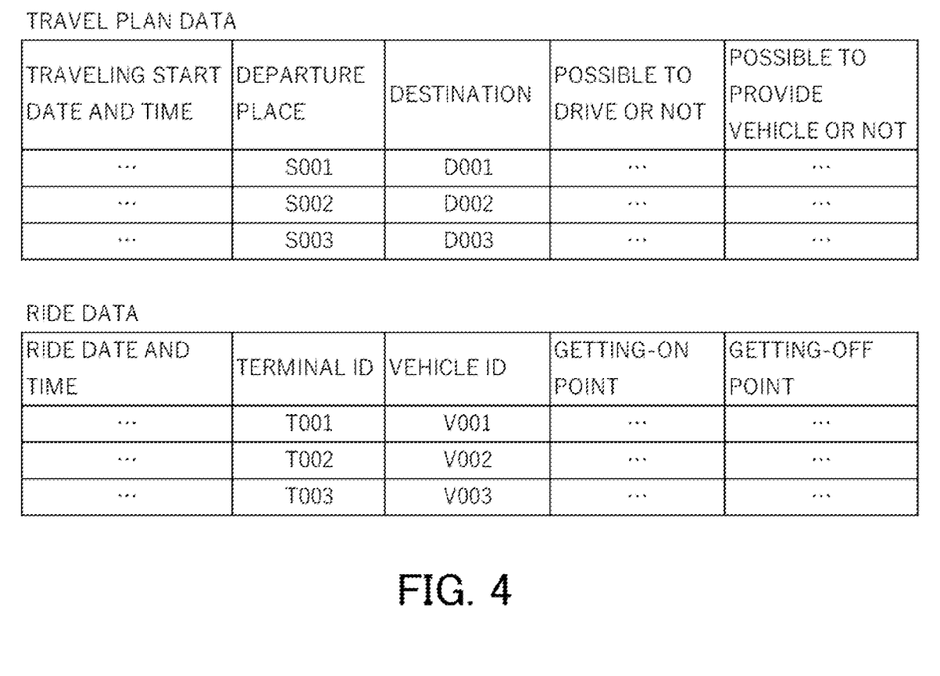
FIG. 4 illustrates an example of travel plan data and ride data.

The travel plan acquiring unit 1021 acquires a request for utilizing a ride-sharing vehicle from a user who possesses the mobile terminal 200. The travel plan acquiring unit 1021 acquires information regarding a departure place, a destination, traveling start date and time, and the like, (hereinafter, referred to as a travel plan) from the mobile terminal 200A which is a driver terminal. Further, the travel plan acquiring unit 1021 acquires a travel plan in a similar manner from the mobile terminal 200B which is a passenger terminal. These kinds of information are stored in the storage 103 which will be described later as travel plan data. FIG. 4(A) illustrates an example of the travel plan data.

The matching unit 1022 matches two or more users who can get on the same vehicle as passengers on the basis of travel plan data corresponding to the respective users. When matching is successful, the matching unit 1022 determines a driver and passengers and generates data (hereinafter, ride data) including the vehicle 10 which is to travel, getting-on points and getting-off points of the respective users, and the like. FIG. 4(B) illustrates an example of the ride data. The ride data may take any form if it is possible to identify the vehicle which is to travel and points at which the respective users get on and get off the vehicle.

The ride data is transmitted to the mobile terminal 200 possessed by each user and presented to each user by the mobile terminal 200. Data regarding getting-on and getting-off of the passenger himself/herself is transmitted to the passenger terminal, and data regarding getting-on and getting-off of the driver and all the passengers is transmitted to the driver terminal.

Note that in a case where the vehicle 10 which is to travel is not owned by the driver himself/herself, the matching unit 1022 further reserves utilization of the vehicle 10. In this case, the matching unit 1022 may generate information regarding a vehicle to be lent (including a location where the vehicle is to be lent, date and time at which the vehicle is to be lent, date and time at which the vehicle is to be returned, and the like. Hereinafter referred to as lent vehicle data) and may transmit the information to the driver terminal.

The key managing unit 1023 acquires an electronic key corresponding to the vehicle 10 on the basis of the ride data. The electronic key is electronic data for receiving authentication from the in-vehicle device 300 mounted on the vehicle 10.

The electronic key may be acquired from the one stored in advance or may be dynamically generated. For example, it is also possible to generate an electronic key which is effective only in a predetermined time slot, an electronic key for which the number of times of use is designated, an electronic key which can be used only at a predetermined mobile terminal, or the like.

The key managing unit 1023 delivers the acquired electronic key to the driver terminal and the passenger terminal. The electronic key can be set as, for example, a temporary key for getting on the vehicle 10.

The storage 103, which is a unit configured to store information, and is formed from a storage medium such as a RAM, a magnetic disk and a flash memory. In the storage 103, various kinds of programs to be executed at the controller 102, data to be utilized by the program, and the like, are stored. Further, in the storage 103, data (authentication related data) for generating the electronic key described above, the travel plan data described above, and the ride data are stored.

The mobile terminal 200 will be described next.

Figure 5:
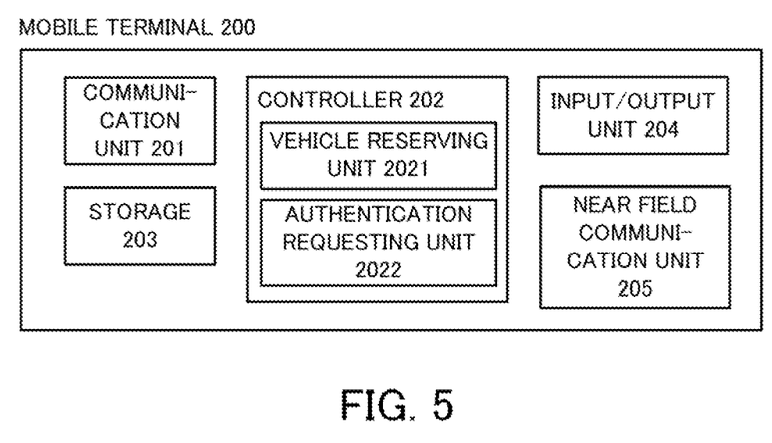
FIG. 5 is a block diagram schematically illustrating an example of a mobile terminal.

FIG. 5 is a system configuration diagram of the mobile terminal 200. The mobile terminal 200 is a small computer such as a smartphone, a mobile terminal, a tablet terminal, a personal information terminal, and a wearable computer (such as a smart watch). The mobile terminal 200 includes a communication unit 201, a controller 202, a storage 203, an input/output unit 204, and a near field communication unit 205.

The communication unit 201 is a unit configured to connect the mobile terminal 200 to a network. In the present embodiment, it is possible to perform communication with other apparatuses (for example, the server apparatus 100) via a network by utilizing mobile communication service such as 4G and LTE.

The controller 202 is a unit configured to control the mobile terminal 200. The controller 202 is formed from, for example, a microcomputer. The controller 202 may implement these functions by a program stored in the storage 203 which will be described later being executed by a CPU.

The controller 202 includes a vehicle reserving unit 2021 and an authentication requesting unit 2022 as functional modules. The respective functional modules may be implemented by a program stored in storage (such as a ROM) being executed by a CPU.

The vehicle reserving unit 2021 transmits information (travel plan) regarding traveling of the user to the server apparatus 100 and receives a result of matching. When matching is successful, the vehicle reserving unit 2021 receives information regarding the vehicle 10 which is to travel and the ride data including getting-on points, getting-off points, and the like, from the server apparatus 100. Further, in a case where the mobile terminal 200 is a driver terminal, and the vehicle is to be lent, the vehicle reserving unit 2021 receives lent vehicle data from the server apparatus 100. Further, the vehicle reserving unit 2021 provides information to the user on the basis of the received data.

The authentication requesting unit 2022 executes processing of acquiring an electronic key corresponding to the vehicle 10 from the server apparatus 100 and processing of transmitting the electronic key to the in-vehicle device 300 and requesting locking and unlocking of the vehicle 10.

The authentication requesting unit 2022 first performs processing of acquiring an electronic key. In the present embodiment, the authentication requesting unit 2022 receives an electronic key corresponding to the vehicle 10 which is to travel from the server apparatus 100 at a timing at which reservation of the ride-sharing vehicle is established.

The authentication requesting unit 2022 secondly provides an operation screen to the user via the input/output unit 204 which will be described later and generates a request for locking or unlocking on the basis of operation performed by the user. For example, the authentication requesting unit 2022 outputs an icon for unlocking, an icon for locking, or the like, on a touch panel display and generates data for requesting locking or unlocking on the basis of operation performed by the user. The data is transmitted to the in-vehicle device 300 along with the electronic key.

Note that the operation performed by the user is not limited to operation performed via the touch panel display. For example, the operation may be performed with a hardware switch, and the like.

Note that in a case where the mobile terminal 200 does not have an electronic key, neither locking operation nor unlocking operation can be performed from the operation screen.

The electronic key to be acquired by the mobile terminal 200 may be a permanent key or may be a one-time key. In either case, data (authentication information) against which the electronic key is to be checked is stored in advance in the in-vehicle device 300.

The storage 203, which is a unit configured to store information, and is formed from a storage medium such as a RAM, a magnetic disk and a flash memory. In the storage 203, an electronic key transmitted from the server apparatus 100, various kinds of programs to be executed at the controller 202, data, and the like, are stored.

The input/output unit 204 is a unit configured to accept input operation performed by the user and to present information to the user. Specifically, the input/output unit 204 is formed from a touch panel and its controller, and a liquid crystal display and its controller. The touch panel and the liquid crystal display are formed as one touch panel display in the present embodiment.

The near field communication unit 205 is an interface for performing near field communication with the in-vehicle device 300. The near field communication unit 205 performs communication in a short range (approximately several centimeters) using a predetermined wireless communication standard.

In the present embodiment, the near field communication unit 205 performs data communication through NFC (Near Field Communication). Note that while NFC will be described as an example in the present embodiment, it is also possible to utilize other wireless communication standards. For example, it is also possible to utilize Bluetooth (registered trademark), UWB (Ultra Wideband), Wi-Fi (registered trademark), or the like.

The in-vehicle device 300 will be described next.

Figure 6:
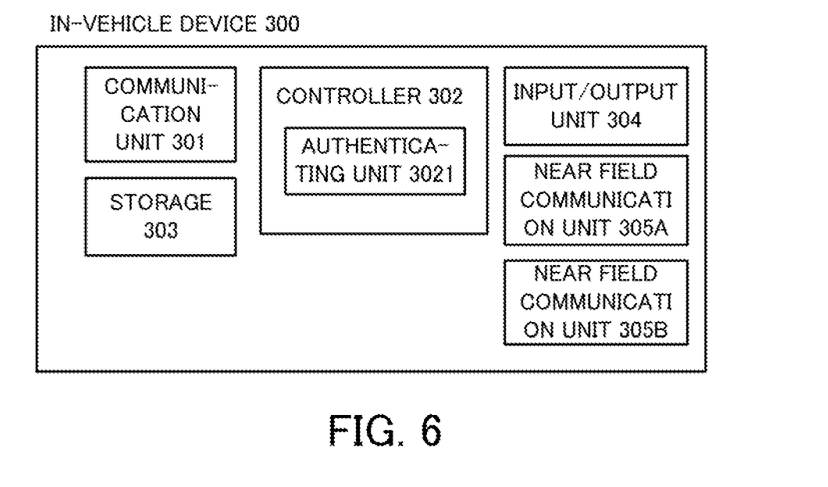
FIG. 6 is a block diagram schematically illustrating an example of an in-vehicle device.

FIG. 6 is a system configuration diagram of the in-vehicle device 300. The in-vehicle device 300, which is a device which controls locking and unlocking of the vehicle 10, constitutes part of a smart key system. In the present embodiment, the in-vehicle device 300 is a device mounted on the vehicle 10.

The in-vehicle device 300 has a function of performing near field communication with the mobile terminal 200 to authenticate the mobile terminal 200, and a function of locking and unlocking an electronic lock on the basis of a result of authenticating the mobile terminal 200. Note that while a term of locking and unlocking is used in the present embodiment, the in-vehicle device 300 may allow starting of an engine provided at the vehicle 10 on the basis of the authentication result.

The in-vehicle device 300 includes a communication unit 301, a controller 302, a storage 303, an input/output unit 304, and near field communication units 305A and 305B.

The communication unit 301 is a unit configured to perform communication with the server apparatus 100 or the mobile terminal 200 in accordance with the same communication standard as that of the communication unit 101 and the communication unit 201.

The controller 302 is a module for performing control of performing near field communication with the mobile terminal 200 via the near field communication unit 305A (305B) which will be described later and authenticating the mobile terminal 200, and performing control of locking and unlocking the electronic lock on the basis of an authentication result. The controller 302 is, for example, formed from a microcomputer.

The controller 302 includes an authenticating unit 3021 as a functional module. The functional module may be implemented by a program stored in storage (such as a ROM) being executed by a CPU.

The authenticating unit 3021 authenticates the mobile terminal 200 on the basis of the electronic key transmitted from the mobile terminal 200. Specifically, the authenticating unit 3021 checks the electronic key transmitted from the mobile terminal 200 against authentication information stored in the storage 303, and when the electronic key matches the authentication information, judges that authentication is successful. When the electronic key does not match the authentication information, the authenticating unit 3021 judges that authentication is failed. When authentication of the mobile terminal 200 has been successful, the authenticating unit 3021 transmits a command for locking and unlocking to the electronic lock provided at the vehicle 10. Note that the authenticating unit 3021 may use an authentication scheme in which authentication information is simply compared to verify identity or may use a scheme which uses asymmetric encryption.

The authenticating unit 3021 changes process of authentication depending on whether the mobile terminal 200 which performs communication is the driver terminal or the passenger terminal. This will be described later.

The storage 303, which is a unit configured to store information, and is formed from a storage medium such as a RAM, a magnetic disk and a flash memory. In the storage 303, authentication information against which the electronic key transmitted from the mobile terminal 200 is to be checked, various kinds of programs to be executed at the controller 302, data, and the like, are stored.

The input/output unit 304 is a unit configured to accept input operation performed by the user and to present information to the user in a similar manner to the input/output unit 204. Specifically, the input/output unit 304 is formed from a touch panel and its controller, and a liquid crystal display and its controller.

The near field communication units 305A and 305B are units configured to perform communication with the mobile terminal 200 in accordance with the same communication standard as that of the near field communication unit 205.

In the present embodiment, the near field communication unit 305A includes a reading device provided outward from the vehicle. The near field communication unit 305A performs near field communication with the mobile terminal 200 located outside the vehicle through NFC so as to be able to acquire an electronic key.

Further, the near field communication unit 305B includes a reading device provided inside the vehicle (for example, beside the driver's seat). The near field communication unit 305B performs near field communication with the mobile terminal 200 located inside the vehicle through NFC so as to be able to acquire an electronic key.

Figure 7:
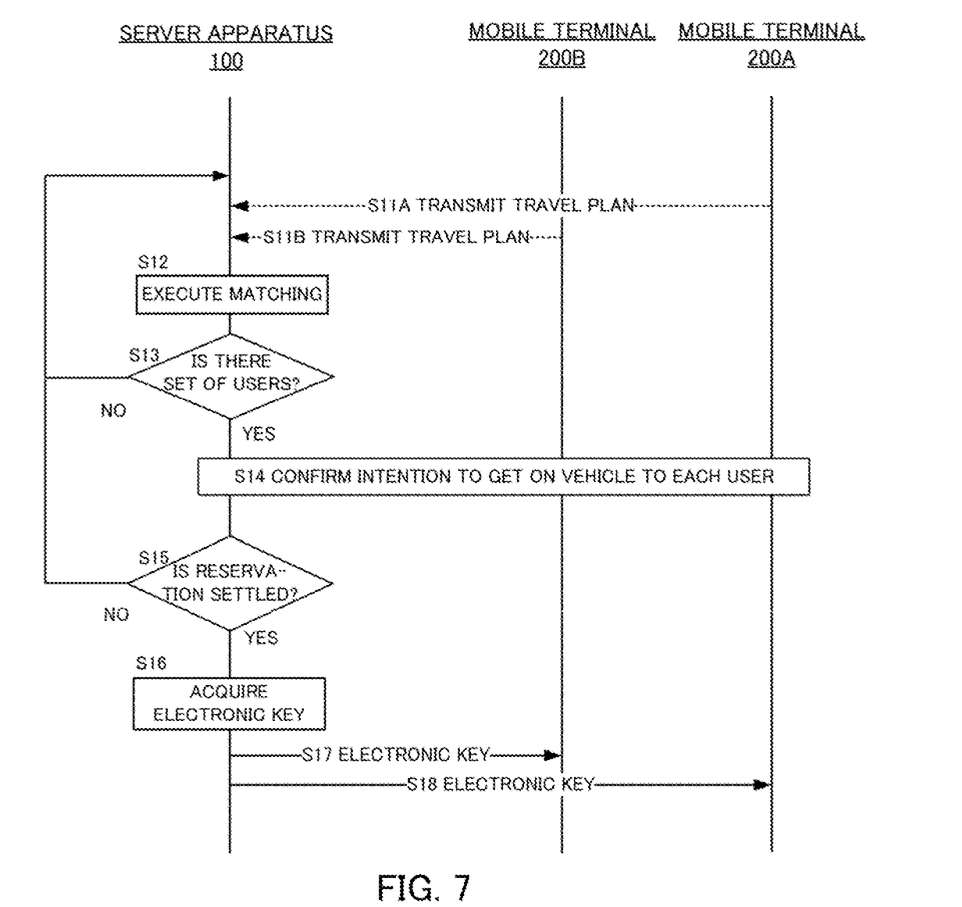
FIG. 7 is a flowchart of data to be transmitted and received by respective components.

FIG. 7 is a diagram illustrating flow of data to be transmitted and received among the respective components described above.

The mobile terminal 200A which is a driver terminal and the mobile terminal 200B which is a passenger terminal transmit travel plans to the server apparatus 100 at arbitrary timings (step S11A and S11B). As described above, the travel plan includes information regarding a departure place, a destination, traveling start date and time, and the like. The travel plan is accumulated by the server apparatus 100 and processed at a predetermined timing.

In step S12, the server apparatus 100 matches users to each other on the basis of the accumulated travel plan. Matching refers to processing of associating users who can travel by getting on the same vehicle. For example, a plurality of users whose departure places and destinations are located on the same route can get on the same vehicle to travel. Matching can be performed using a publicly known technique.

In step S13, the server apparatus 100 determines that a set of users who get on the same vehicle to travel can be generated. Here, in a case where a set of users can be generated, the processing transitions to step S14, where the server apparatus 100 transmits ride data to each mobile terminal 200 and makes final confirmation regarding intention to get on the vehicle to each user.

Here, in a case where consent can be obtained from each user, the server apparatus 100 settles reservation of a sharing vehicle (step S15: Yes). In a case consent cannot be obtained, the processing returns to the beginning (step S15: No).

In step S16, the server apparatus 100 acquires electronic keys to be transmitted to the mobile terminals 200A and 200B. The electronic key to be transmitted to the mobile terminal 200A is an electronic key (first electronic key) to be utilized by a driver. The first electronic key is a key which enables locking, unlocking and starting of the vehicle. Further, the electronic key to be transmitted to the mobile terminal 200B is an electronic key (second electronic key) to be utilized by a passenger. The second electronic key is a key which enables only locking and unlocking of the vehicle.

Each electronic key is transmitted to each mobile terminal 200 in step S17 and step S18.

Processing of the in-vehicle device 300 mounted on the vehicle 10 authenticating the mobile terminal 200 will be described next with reference to FIG. 8.

When a user who tries to get on the vehicle transmits an unlocking request from the mobile terminal 200, the in-vehicle device 300 receives this unlocking request (step S21). The unlocking request includes a type (whether the mobile terminal is a driver terminal or a passenger terminal) of the mobile terminal 200.

Then, in step S22, the in-vehicle device 300 determines the type of the mobile terminal which has transmitted the request. Here, in a case where the mobile terminal 200 which has transmitted the request is a driver terminal, the processing transitions to step S23. Meanwhile, in a case where the mobile terminal 200 which has transmitted the request is a passenger terminal, the processing transitions to step S25.

In step S23, the authenticating unit 3021 acquires the first electronic key via the near field communication unit 305A.

Then, in step S24, the authenticating unit 3021 verifies the first electronic key, and when it is determined that authentication is successful, the vehicle 10 is unlocked. Note that in a case where the first electronic key has been authenticated, it is also possible to start an engine of the vehicle.

In a case where the mobile terminal which has transmitted the request is a passenger terminal, the processing transitions to step S25, where the authenticating unit 3021 acquires the second electronic key via the near field communication unit 305A.

Further, the authenticating unit 3021 acquires the first electronic key again via the near field communication unit 305B (step S26). In this event, the in-vehicle device 300 may perform communication with the mobile terminal 200A and may encourage the user to touch the reading device of the mobile terminal 200A.

In step S27, the authenticating unit 3021 authenticate both the first electronic key and the second electronic key and determines whether or not both of the authentication have been successful. Here, when both of the authentication have been successful, the vehicle 10 is unlocked. In a case where one of the authentication has been failed, or in a case where the first electronic key has not been transmitted from the driver terminal within a predetermined period, unlocking is rejected.

As described above, in the authentication system according to the first embodiment, process for authenticating a key is changed between when the driver gets on the vehicle and when the passenger gets on the vehicle. This prevents the passenger from getting on the vehicle unless the driver indicates his/her intention, so that it is possible to improve security.

Second Embodiment

In the first embodiment, the in-vehicle device 300 authenticates the electronic key. Meanwhile, in the second embodiment, the server apparatus 100 authenticates the electronic key.

Figure 9:
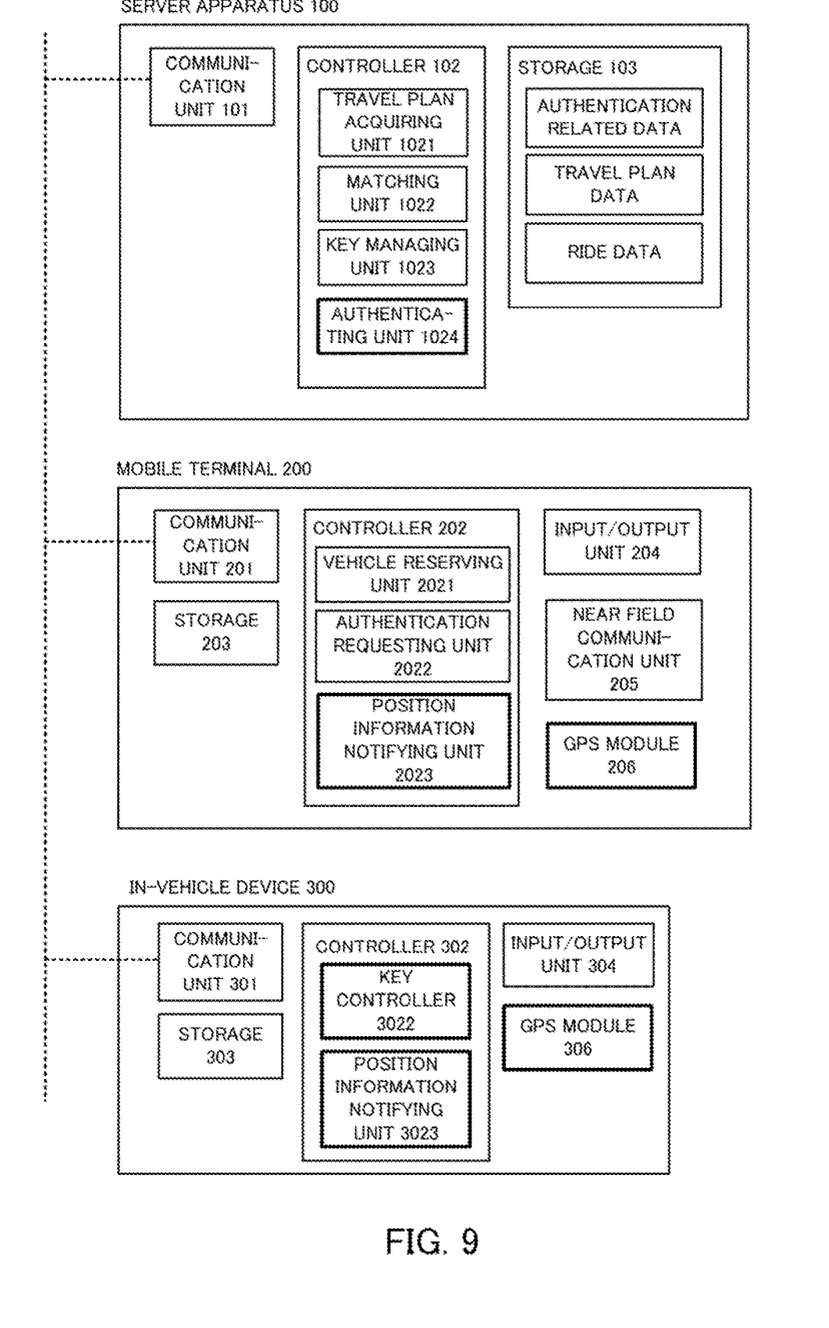
FIG. 9 is a block diagram of respective components in a second embodiment.

FIG. 9 is a system configuration diagram of the server apparatus 100, the mobile terminal 200 and the in-vehicle device 300 according to the second embodiment.

In the second embodiment, the server apparatus 100 (controller 102) further includes an authenticating unit 1024. The authenticating unit 1024 plays a role of the authenticating unit 3021 in the first embodiment. The authenticating unit 1024 is different from the authenticating unit 3021 in that the authenticating unit 1024 acquires an electronic key via a wide area network instead of through near field communication.

Further, the mobile terminal 200 further includes a GPS module 206. Still further, the controller 202 further includes a position information notifying unit 2023.

The GPS module 206 is a module which outputs position information of the own device on the basis of a signal received from a GPS satellite which orbits the earth. The position information notifying unit 2023 transmits the position information acquired via the GPS module 206 to the server apparatus 100.

Further, the in-vehicle device 300 further includes a GPS module 306. Still further, the controller 302 further includes a key controller 3022 and a position information notifying unit 3023. The key controller 3022 is a module having the functions of the authenticating unit 3021 except an authentication function. The key controller 3022 controls an electronic lock in accordance with an instruction from the server apparatus 100.

The position information notifying unit 3023 transmits the position information acquired via the GPS module 306 to the server apparatus 100.

In a third embodiment, the mobile terminal 200 (position information notifying unit 3023) periodically transmits position information of the own device to the server apparatus 100. Further, the in-vehicle device 300 (position information notifying unit 3023) also periodically transmits position information of the own device to the server apparatus 100 in a similar manner. The position information is temporarily stored in the storage 103.

Figure 8:
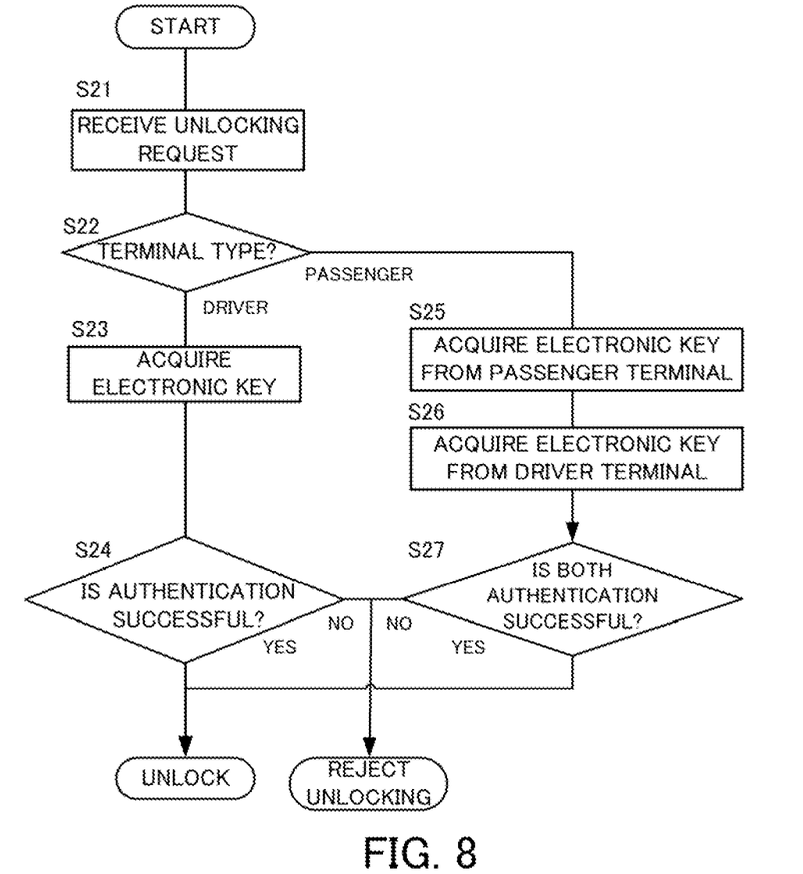
FIG. 8 is a flowchart of processing to be executed by the in-vehicle device.

In the third embodiment, the processing illustrated in FIG. 8 is executed by the server apparatus 100 (authenticating unit 1024). The authenticating unit 1024 acquires an unlocking request, a first electronic key and a second electronic key via a network and performs authentication.

Further, in step S24 and step S27, a condition that "a location indicated with position information of the mobile terminal 200 which has transmitted the electronic key falls within a predetermined range around a location indicated with position information of the in-vehicle device 300" is set as a condition for making authentication successful.

When the authentication has been successful, the authenticating unit 1024 issues an instruction to perform locking and unlocking to the in-vehicle device 300 (key controller 3022), and the vehicle 10 is thereby locked and unlocked.

Note that in the second embodiment, the server apparatus 100 can grasp the position information of the mobile terminal 200 and the in-vehicle device 300. Thus, in a case where the mobile terminal 200B which is a passenger terminal enters a predetermined range around the in-vehicle device 300 in a state where the passenger has not got on the vehicle (in a state where the second electronic key has not been used yet), the driver terminal and the passenger terminal may be notified that the mobile terminal 200B enters the predetermined range. Such a configuration makes it easy for the driver and the passenger to meet.

Modified Examples

The above-described embodiments are merely an example, and the present disclosure can be implemented with change being made as appropriate within the range not deviating from the gist of the disclosure.

Further, the processing and the units described in the present disclosure can be freely combined and implemented unless technical inconsistency arises.

For example, it is also possible to combine a form in which a reading device is utilized to transmit an electronic key and a form in which an electronic key is transmitted via a network. For example, it is also possible to perform first and second authentication by utilizing a reading device, while performing only third authentication via a network.

Further, the processing described as being performed by one apparatus may be shared and executed by a plurality of apparatuses. Alternatively, the processing described as being performed by different apparatuses may be executed by one apparatus. In a computer system, a hardware configuration (server configuration) which implements respective functions can be flexibly changed.

The present disclosure can be implemented by a computer program which implements the functions described in the above-described embodiments being supplied to a computer, and one or more processors provided at the computer reading out and executing the program. Such a computer program may be provided to the computer through a non-temporary computer readable storage medium which can be connected to a system bus of the computer or may be provided to the computer via a network. The non-temporary computer readable storage medium includes, for example, an arbitrary type of disk such as a magnetic disk (such as a floppy (registered trademark) disk and a hard disk drive (HDD)) and an optical disk (such as a CD-ROM and a DVD disk/Blu-ray disk), a read only memory (ROM), a random access memory (RAM), an EPROM, an EEPROM, a magnetic card, a flash memory, an optical card, and an arbitrary type of medium which is appropriate for storing an electronic command.

What is claimed is:

1. An information processing apparatus which controls locking and unlocking of a vehicle, the information processing apparatus comprising:
   a controller configured to execute:
   in a case where there is an unlocking request from a first mobile terminal located outside the vehicle, receiving a first electronic key from the first mobile terminal to perform first authentication and unlocking the vehicle on condition that the first authentication is successful; and
   in a case where the first mobile terminal is located inside the vehicle, and there is an unlocking request from a second mobile terminal located outside the vehicle, receiving a second electronic key from the second mobile terminal to perform second authentication, receiving the first electronic key from the first mobile terminal located inside the vehicle to perform third authentication, and unlocking the vehicle on condition that both the second authentication and the third authentication are successful.

2. The information processing apparatus according to claim 1, wherein
   the controller unlocks the vehicle in a case where both the second authentication and the third authentication are successful within a predetermined period.

3. The information processing apparatus according to claim 1, wherein
   the first electronic key is an electronic key issued to a driver of a ride-sharing vehicle, and
   the second electronic key is an electronic key issued to a passenger of the ride-sharing vehicle.

4. The information processing apparatus according to claim 3, wherein
   the controller enables unlocking and starting of the vehicle in a case where the first authentication is successful, and
   enables unlocking of the vehicle in a case where the second authentication is successful.

5. The information processing apparatus according to claim 1, which is mounted on the vehicle.

6. The information processing apparatus according to claim 5, further comprising:
   a first reading device provided outward from the vehicle, and
   the controller acquires the first electronic key and the second electronic key via the first reading device to perform the first authentication and the second authentication.

7. The information processing apparatus according to claim 6, further comprising:
   a second reading device provided inside the vehicle, wherein the controller acquires the first electronic key via the second reading device to perform the third authentication.

8. The information processing apparatus according to claim 1, which is provided outside the vehicle, wherein
   the controller acquires first position information from the first mobile terminal and acquires second position information from the second mobile terminal.

9. The information processing apparatus according to claim 8, wherein
   the controller performs the first authentication and the third authentication in a case where a location indicated with the first position information is within a predetermined range around the vehicle, and
   performs the second authentication in a case where a location indicated with the second position information is within a predetermined range around the vehicle.

10. The information processing apparatus according to claim 8, wherein
    the controller transmits a notification to the first mobile terminal and the second mobile terminal in a case where the second authentication is not performed and a location indicated with the second position information is within a predetermined range around the vehicle.

11. An authentication system comprising:
    an in-vehicle device which controls locking and unlocking of a vehicle; and
    a server apparatus which manages an electronic key for the locking and unlocking,
    wherein the server apparatus comprises:
    a first controller configured to execute:
    transmitting a first electronic key to a first mobile terminal; and
    transmitting a second electronic key to a second mobile terminal, and
    the in-vehicle device comprises:
    a second controller configured to execute:
    in a case where there is an unlocking request from the first mobile terminal located outside the vehicle, receiving the first electronic key from the first mobile terminal to perform first authentication and unlocking the vehicle on condition that the first authentication is successful; and
    in a case where the first mobile terminal is located inside the vehicle, and there is an unlocking request from the second mobile terminal located outside the vehicle, receiving the second electronic key from the second mobile terminal to perform second authentication, receiving the first electronic key from the first mobile terminal located inside the vehicle to perform third authentication, and unlocking the vehicle on condition that both the second authentication and the third authentication are successful.

12. The authentication system according to claim 11, wherein
    the second controller unlocks the vehicle in a case where both the second authentication and the third authentication are successful within a predetermined period.

13. The authentication system according to claim 11, wherein
    the first electronic key is an electronic key issued to a driver of a ride-sharing vehicle, and
    the second electronic key is an electronic key issued to a passenger of the ride-sharing vehicle.

14. The authentication system according to claim 13, wherein
    the second controller enables unlocking and starting of the vehicle in a case where the first authentication is successful, and
    enables unlocking of the vehicle in a case where the second authentication is successful.

15. The authentication system according to claim 11, wherein
    the in-vehicle device further comprises:

a first reading device provided outward from the vehicle, and the second controller acquires the first electronic key and the second electronic key via the first reading device to perform the first authentication and the second authentication.

16. The authentication system according to claim 15, wherein the in-vehicle device further comprises:

a second reading device provided inside the vehicle, and the second controller acquires the first electronic key via the second reading device to perform the third authentication.

17. The authentication system according to claim 11, wherein the first controller acquires first position information from the first mobile terminal and acquires second position information from the second mobile terminal.

18. The authentication system according to claim 17, wherein the first controller transmits a notification to the first mobile terminal and the second mobile terminal in a case where the second authentication is not performed, and a location indicated with the second position information is within a predetermined range around the vehicle.

19. An information processing method for controlling locking and unlocking of a vehicle, the information processing method comprising:

a step of, in a case where there is an unlocking request from a first mobile terminal located outside the vehicle, receiving a first electronic key from the first mobile terminal to perform first authentication and unlocking the vehicle on condition that the first authentication is successful; and a step of, in a case where the first mobile terminal is located inside the vehicle and there is an unlocking request from a second mobile terminal located outside the vehicle, receiving a second electronic key from the second mobile terminal to perform second authentication, receiving the first electronic key from the first mobile terminal located inside the vehicle to perform third authentication, and unlocking the vehicle on condition that both the second authentication and the third authentication are successful.

20. A non-transitory computer readable storing medium recording a computer program for causing a computer to perform an information processing method according to claim 19.

* * * * *